United States Patent [19]

Moritani et al.

[11] 4,308,189
[45] Dec. 29, 1981

[54] CATIONIC POLYMER EMULSION

[75] Inventors: Tohei Moritani; Takeshi Moritani; Junnosuke Yamauchi; Yoshinari Tanaka; Makoto Shiraishi, all of Kurashiki, Japan

[73] Assignee: Kuraray Company, Limited, Kurashiki, Japan

[21] Appl. No.: 191,665

[22] Filed: Sep. 29, 1980

[30] Foreign Application Priority Data

Sep. 27, 1979 [JP] Japan .................. 54-124865
Nov. 30, 1979 [JP] Japan .................. 54-156016
Dec. 20, 1979 [JP] Japan .................. 54-166347

[51] Int. Cl.$^3$ .......................... C08F 261/04
[52] U.S. Cl. .................. 260/29.6 WA; 260/29.6 WB; 525/59; 526/202
[58] Field of Search ............ 260/29.6 WA, 29.6 WB, 260/29.6 RW, 29.7 W, 29.7 WA; 526/202; 525/57, 59

[56] References Cited

U.S. PATENT DOCUMENTS

| | | | |
|---|---|---|---|
| 3,198,762 | 8/1965 | Maeder | 260/29.6 H |
| 3,345,346 | 10/1967 | Reynolds | 260/79.3 |
| 3,549,578 | 12/1970 | Ehmann | 260/29.6 WA |
| 3,660,324 | 5/1972 | Onchi | 260/29.7 N |

FOREIGN PATENT DOCUMENTS 31-3319 of 1956 Japan .
46-22922 of 1971 Japan .
48-62881 of 1973 Japan .
48-92488 of 1973 Japan .
52-3689 of 1977 Japan .
54-101996 of 1979 Japan .

OTHER PUBLICATIONS

J. Polymer Science Polymer Symposia, Organized Structures in Polymer Solutions and Gels, 1973.
Japanese Polymer Science & Tech., vol. 8, p. 467, 1951.
Kogyo Kagaku Zasshi, vol. 59, p. 658, 1956, Akiyoshi.
Kogyo Kagaku Zasshi, vol. 60, p. 353, 1951, Furukawa.

*Primary Examiner*—Paul R. Michl
*Attorney, Agent, or Firm*—Oblon, Fisher, Spivak, McClelland & Maier

[57] ABSTRACT

Cationic emulsions are obtained by the emulsion polymerization or copolymerization of ethylenically unsaturated monomers such as vinyl acetate, etc. in the presence of a cationic group-modified polyvinyl alcohol (PVA). Typical cationic group-modified PVA are the modified PVA's which contain a copolymeric unit having one of the following formulas:

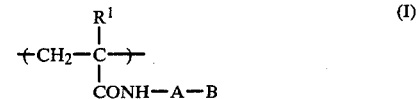

wherein R$^1$ is H or lower alkyl; B is

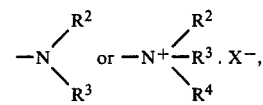

R$^2$, R$^3$ and R$^4$ are each lower alkyl (substituted or unsubstituted) and X is an anion forming a salt with the ammonium N; and A is an inert bivalent organic group linking the N atom in B to the N atom in the amide group;

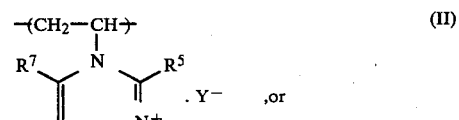

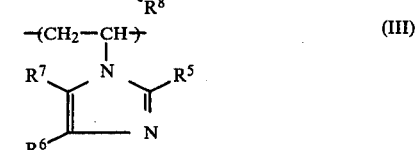

wherein, in formulas (II) and (III), R$^5$, R$^6$ and R$^7$ are each H, lower alkyl or phenyl; R$^8$ is lower alkyl; and Y is an anion forming a salt with the imidazolinium N atom. Particularly desirable are the cationic group-modified PVA's containing the copolymeric unit (I) wherein A is

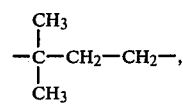

R$^2$, R$^3$ and R$^4$ each is methyl and X is chlorine, or wherein R$^1$ is methyl, A is —CH$_2$—CH$_2$—CH$_2$—, R$^2$, R$^3$ and R$^4$ in B are each methyl and X is chlorine, and cationic group-modified PVA's containing the copolymeric unit (II) or (III) wherein R$^5$ and R$^8$ are each methyl and R$^6$ and R$^7$ are each hydrogen. The polymers of these cationic emulsion have superior binding properties to substrates such as pulp fibers, textile fibers, glass, and the like.

12 Claims, No Drawings

CATIONIC POLYMER EMULSION

BACKGROUND OF THE INVENTION

1. Field of the Invention

This invention relates to a novel cationic polymer emulsion with improved performance, stability and economics. More particularly, the invention relates to a cationic emulsion as produced by emulsion polymerization of an ethylenically unsaturated monomer in the presence of a modified polyvinyl alcohol (hereinafter abbreviated as PVA) containing cationic groups.

2. Description of the Prior Art

Heretofore, in the production of a vinyl polymer emulsion, it has been common practice to employ, as an emulsion stabilizer, a surfactant such as a nonionic emulsifier or an anionic emulsifier and a water-soluble macromolecular substance such as PVA or hydroxyethylcellulose, either singly or in combination. The resultant emulsion particles are of necessity electrically neutral or negatively charged. Emulsions of positively charged particles, i.e., cationic emulsions, are also known and while cationic emulsions have been found to have superior fixation and bonding characteristics, they have so far been used only in special and limited applications. Probably this has been occasioned by the fact that there has been no effective process for the production of a cationic emulsion having satisfactory stability, performance and/or toxicity.

It is already known that a cationic emulsion can be produced by emulsion polymerization using a cationic surfactant as an emulsifying agent. Cationic chloroprene latex and some other products have been obtained by using a laurylamine salt, octadecylamine salt, laurylpyridinium chloride, octylbenzyltrimethylammonium chloride or the like as an emulsifying agent (Japanese Published Unexamined Patent No. 62881/1973). It is also within the knowledge of those skilled in the art that after a vinyl polymer emulsion has been produced using a nonionic or anionic emulsifier, a cationic surfactant or a cation-type surfactant such as alkylaminopolyoxyethylene can be added to the emulsion to control the pH thereof and to thereby render the emulsion particles cationic (U.S. Pat. No. 3,660,324). However, the use of cationic surfactants is subject to stringent regulatory control because of their toxicity. It is also known to make emulsion particles cationic by means of a cation-type polymerization initiator such as 2-azobis(2-methylpropamidinium)dihydrochloride or 2-azobis(2'-isopropylimidazolinium)dihydrochloride or the like (Japanese Published Unexamined Patent No. 92488/1973). However, this method generally provides emulsions having inadequate cationic properties. There has also been proposed an "emulsifier-free emulsion polymerization method" wherein a monomer containing a quaternary cation group is copolymerized with a different monomer in a first stage of polymerization and, then, an emulsion polymerization is conducted in the presence of the resulting copolymer which functions as a protective colloid (U.S. Pat. No. 3,198,762). This method, however, requires sophisticated reaction control and does not easily provide a stable emulsion. It has also been proposed to produce a cationic emulsion by conducting an emulsion polymerization in the presence of cationic starch, cationic cellulose or cationic polyamide-polyamine epichlorohydrin as a protective colloid. Since these water-soluble polymers are low in emulsion stabilizing action and, when used alone, do not provide a stable emulsion, they are generally used in combination with a nonionic surfactant (Japanese Published Unexamined Patent No. 101996/1979, Japanese Publication No. 22922/1971). However, the resulting emulsions are not fully satisfactory with respect to their balance of cationic properties and emulsion stability.

PVA has heretofore been known as a water-soluble polymer which is an excellent protective colloid and has been used in the emulsion polymerization of many ethylenically unsaturated monomers. In vinyl acetate emulsions, especially, or copolymer emulsions based on vinyl acetate and other monomers such as ethylene, acrylic acid esters, maleic acid diesters, vinyl versatate, etc., PVA exhibits an excellent emulsion stabilizing action and permits production of stable emulsions without the aid of surfactants or other emulsifiers. While PVA is thus known as an excellent emulsion stabilizer, it has never been recognized that a cation-modified PVA is useful as an emulsion stabilizer. This is because the several methods proposed for introducing cationic groups into PVA involve high cost and commercially difficult procedures. Moreover, it appears that since many of the methods which have been suggested require modifying PVA with cations under strongly alkaline or strongly acidic conditions, it has been practically impossible to obtain a modified PVA containing vinyl acetate units, that is a partially saponified modified PVA. The emulsion stabilizing action of a completely saponified PVA is generally poor while a partial hydrolysate with an adequate degree of saponification and a suitable distribution of acetyl groups is a good emulsion stabilizer. In view of the industrial utility of cation-modified PVA, the present inventors investigated the possibility of producing such a cation-modified PVA advantageously on a commercial scale. As a result, the present inventors already disclosed such a method in Japanese Patent Application 89078/1979. This production method was an important advance since it permitted a liberal control of the amount of cationic groups and a free control of the degree of saponification. Following the above development, the present inventors performed emulsion-polymerizations of various ethylenically unsaturated monomers using as emulsion stabilizers a variety of cationic group-modified PVA's as synthesized by the above method. Various suitable combinations of cationic group content, degree of saponification and degree of polymerization were tried, and ultimately highly stable cationic emulsions were successfully produced. In producing these excellent cationic emulsions, the conventional emulsion-polymerization procedure using ordinary PVA as an emulsion stabilizer can be utilized without modification and no special operation or special additive is necessary. PVA is simply replaced with a cation-modified PVA. Not only is the method convenient and expedient, but it was found to yield very stable cationic emulsions. Therefore, the method is advantageous in terms of cost and ease of production. Furthermore, in terms of performance, too, these emulsions proved to be superior. They were found to have by far more highly cationic properties than the cationic emulsions of the prior art and commercial cationic emulsions, and accordingly exhibited an improved fixation affinity for pulp and an improved bonding affinity for glass, sand, concrete and other substrates. It was thus confirmed that these cationic emulsions are very useful in several application such as paper-making, civil engineering and construction. The above findings were followed by further research which has resulted in the development of this invention.

SUMMARY OF THE INVENTION

Accordingly, it is an object of this invention to provide improved cationic emulsions.

A further object is to provide improved cationic-modified polyvinyl alcohols which are useful as emulsifiers for the preparation of cationic emulsions.

Further objects of the invention will become apparent from the description of the invention which follows.

The objects of the invention are achieved by providing a cationic emulsion prepared by emulsion polymerization of an ethylenically unsaturated monomer in an aqueous medium in the presence of a cationic group-modified polyvinyl alcohol.

The cationic group-modified PVA used in the production of the new cationic emulsion according to this invention is a modified PVA containing a prescribed proportion of cationic groups in its backbone (main chain) or in its side chain, and its degree of saponification and degree of polymerization are selected, in accordance with the desired degree of emulsion stability, viscosity and other properties. The term 'cationic group' as used in this specification means any and all of the chemical structural units which are positively charged on ionic dissociation in water, such as primary amines, secondary amines, tertiary amines, quaternary ammonium salts, pyridines, pyridinium, imidazoles, imidazolinium, sulfonium, phosphonium and the like.

DETAILED DESCRIPTION OF THE INVENTION AND PREFERRED EMBODIMENTS

Several methods are known for producing cation-modified PVA. Thus, there may be mentioned the method in which vinylpyridine is copolymerized with vinyl acetate and the resulting copolymer is saponified, the method in which N-vinylphthalimide or N-vinylsuccinimide is copolymerized with vinyl acetate, the resulting copolymer is saponified and the imide groups are decomposed with alkali or hydrazine, the method in which PVA is aminoacetalized or aminobenzoacetalized in the presence of an acid catalyst, the method in which PVA is reacted with an alkoxydimethylamine, glycidyltrimethylammonium hydrochloride or 3-chloro-2-hydroxypropyltrimethylammonium hydrochloride, and the method in which acrylamide groups are added to PVA by a Michael condensation and, then, amino groups are introduced by the Hofmann degradation. The cation-modified PVA's synthesized by these known methods may be utilized in the production of cationic emulsions according to this invention. However, these known production methods are commercially somewhat disadvantageous. Thus, in addition to the difficulties encountered in the cationization process itself, another disadvantage arises because if a partial hydrolysate is to be produced for the purpose of implementing a satisfactory emulsion stability characteristic, a complicated procedure must be employed which requires a reacetylation reaction and a subsequent resaponification reaction.

In contrast, by the method for producing a cation group-modified PVA which the present inventors previously disclosed in Japanese Patent Application No. 89078/1979, the introduction of cationic groups and the attainment of a use-tailored degree of polymerization can both be accomplished stably and easily. The resulting modified PVA, i.e., a modified PVA containing a copolymeric unit of the following formula (I):

wherein $R^1$ is H or lower alkyl; B is

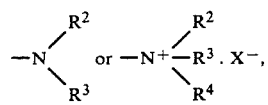

$R^2$, $R^3$ and $R^4$ are each lower alkyl (which may be substituted or unsubstituted), X is an anion forming a salt with the ammonium N; and A is an inert bivalent organic group linking the N atom in B to the N atom of the amide group, is most effective for the production of an emulsion according to this invention. The cationic emulsion of this invention can be readily produced by conducting an emulsion polymerization in the presence of the above modified PVA.

The specification of Japanese Patent Application No. 89078/1979 includes a detailed description of the method for producing a modified PVA containing copolymeric units of formula (I). Such a modified PVA can be easily produced in the following manner. First, a vinyl ester, especially vinyl acetate, is copolymerized with a polymerizable monomer of the following formula (1):

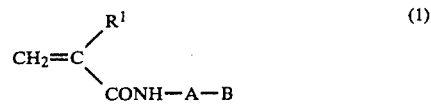

wherein $R^1$ is H or lower alkyl; B is

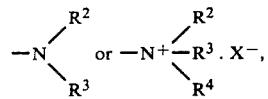

$R^2$, $R^3$ and $R^4$ each lower alkyl (substituted or unsubstituted), X is an anion forming a salt with the ammonium N atom; and A is an inert bivalent organic group linking the N atom in B to the N-atom of the amide group, in the presence of a radical polymerization initiator. Then, after the resulting copolymer is quaternized with a quaternizing agent when B is

or without carrying out such a quaterinization, the copolymer is dissolved in alcohol and treated with an alkali or acid atalyst to saponify the vinyl ester units thereof either partially or to a very great extent according to the intended use of the final emulsion product. When B is

and the abovementioned quaternization treatment has not been carried out, said saponification treatment is followed by the quaternization of

with said quaternizing agent. As examples of monomers of formula (1), there may be mentioned N-(1,1-dimethyl-3-dimethylaminopropyl)acrylamide, trimethyl-3-(1-acrylamido-1,1-dimethylpropyl)ammonium chloride, N-(1,1-dimethyl-3-dimethylaminobutyl)acrylamide, trimethyl-3-(1-acrylamido-1,1-dimethylbutyl)ammonium chloride, N-(1-methyl-1,3-diphenyl-3-diethyl-amino-propyl)methacrylamide, N-(3-dimethyl-amino-propyl)acrylamide, trimethyl-3-(1-acryl-amidopropyl)ammonium chloride, dimethylacryl-amidopropyl-4-trimethylammoniumbutenyl-2-ammonium chloride, 2-acrylamidomethoxy)ethyltrimethylammonium chloride, N-(3-dimethyl-aminopropyl)methacrylamide, trimethyl-3-(1-methacrylamidopropyl)ammonium chloride, etc.

The inert bivalent organic group A which links the N atom of the B group to the nitrogen atom of the amide group may be any organic linking group which is not incompatible with the cationic character of the modified PVA. It is preferred that the linking group be a bivalent lower aliphatic radical. The term "lower" used in referring to the alkyl radical has its conventional meaning of up to about 6 carbon atoms.

Among these compounds, the following four monomers (shown with their molecular formulas) are especially desirable for the preparation of cation-modified PVA suitable for the production of cationic emulsions according to this invention from the standpoints of rate of polymerization, stability of amide groups and economics of polymer production.

N-(1,1-dimethyl-3-dimethylaminopropyl)acrylamide

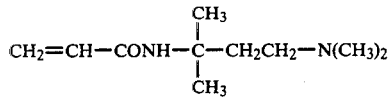

Trimethyl-3-(1-acrylamido-1,1-dimethylpropyl)ammonium chloride

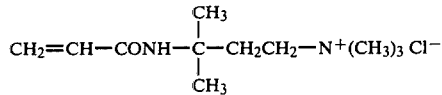

N-(3-dimethylaminopropyl)methacrylamide

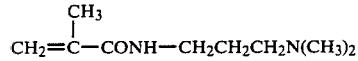

Trimethyl-3-(1-methacrylamidopropyl)ammonium chloride

-continued

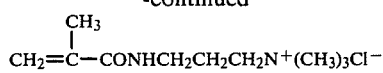

The cationic emulsion of this invention can also be produced by emulsion polymerization of an ethylenically unsaturated monomer in the presence of a cation-modified PVA containing a copolymer unit of the general formula (II) or (III).

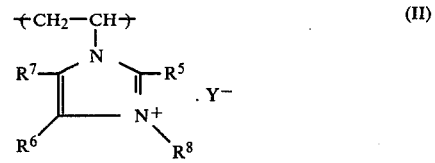

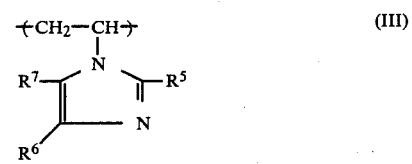

wherein $R^5$, $R^6$ and $R^7$ are each H, lower alkyl or phenyl; $R^8$ is lower alkyl; and Y is an anion forming a salt with the imidazolinium nitrogen atom.

Such a modified PVA can be easily produced in the following manner. Thus, a vinyl ester, e.g., vinyl acetate in particular, is copolymerized with a polymerizable monomer of formula (2) or (3)

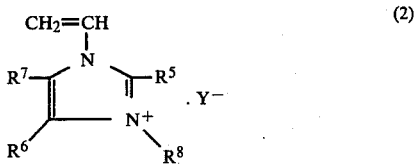

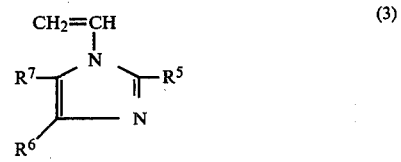

wherein $R^5$, $R^6$, $R^7$, $R^8$ and Y are as previously defined, in the presence of a radical polymerization initiator. Then, if said copolymerizable monomer is a compound of formula (3), the copolymer may be quaternized with a quaternizing agent. This quaternization treatment may be omitted at this stage. Then, an alkaline or acidic catalyst is permitted to act on an alcohol solution of the copolymer to saponify its vinyl ester units into vinyl alcohol units either partially or to a very high degree according to the intended use of the final emulsion. When said copolymerizable monomer is a compound of formula (3) and the quaternization treatment has been omitted, the quaternization treatment may be finally carried out. The monomer of general formula (3) is exemplified by 1-vinylimidazole, 1-vinyl-2-methylimidazole, 1-vinyl-2-ethylimidazole, 1-vinyl-2-phenylimidazole, 1-vinyl-2,3-dimethylimidazole, 1-vinyl-2,4,5-trimethylimidazole, etc. The monomer of general formula (2) can be prepared by quaternizing a monomer of general formula (3) with a quaternizing agent such as an alkyl halide, dimethyl sulfate, methyl p-toluenesulfonate or the like. Among the above-mentioned monomers, 1-vinyl-2-methylimidazole:

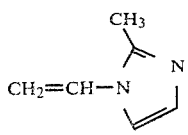

and 1-vinyl-2,3-dimethylimidazolinium chloride:

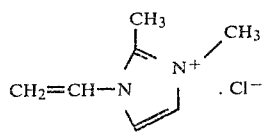

are especially desirable because of the polymerization rate and stability of the emulsion and also from the economic point of view.

There are no critical limitations on the cationic group content and degree of saponification of the cation-modified PVA used as an emulsion stabilizer in the production of the emulsion according to this invention, or on the degree of polymerization of modified PVA; these parameters may be selected according to the intended application of the product emulsion. It is, however, important that these three parameters be selected in an appropriate combination. For many purposes, the cationic group content is selected from the range of 0.01 to 10 mol percent, the degree of saponification from the range of 60 to 100 mol %, and the degree of polymerization from the range 300 to 3000. Generally speaking, a partial hydrolysate with a suitable degree of saponification is superior to a completely saponified one in emulsion stabilizing effect, and has the advantage that no concomitant use of a surfactant is required in the polymerization of vinyl acetate and certain other emulsions. Also, for the purpose of producing high-viscosity emulsions, it is possible to employ a partially saponified PVA produced by a saponification method which gives rise to a block-like arrangement of acetyl groups of modified PVA along its molecular chain. A completely or highly saponified product, which is generally low in emulsion stabilizing effect, may be employed for the present invention, where it may be advantageous to carry out an emulsion polymerization in combination with another emulsifier such as a partial hydrolysate of cation-modified PVA or partial hydrolysate of ordinary PVA or surfactant.

The proportion of said cationic group-modified PVA to be used in the production of an emulsion according to this invention is desirably within the range of 0.01 to 20 weight parts per 100 weight parts of ethylenically unsaturated monomor. It is permissible to employ such a cationic group-modified PVA in combination with ordinary completely saponified PVA and/or partially saponified PVA, and generally the total proportion of PVA is desirably within the range of 1 to 20 weight parts on the same basis as above.

In the production of an emulsion according to this invention, a nonionic surfactant or a cationic surfactant may be added if necessary. Especially in the case of ethylenically unsaturated monomers other than vinyl acetate, it is rather desirable to employ a surfactant within the limits of 5 weight parts at the maximum per 100 weight parts of the ethylenically unsaturaged monomer for the purpose of improving the mechanical stability of the emulsion. However, since excessive use of a surfactant causes a reduced resistance of the emulsion to water and a reduced adhesive affinity in field applications, sufficient care should be exercised in using a surfactant for the above purpose. Moreover, the amount of cationic surfactants must be selected with consideration of their toxicity. As examples of the nonionic surfactants which may thus be concomitantly employed, there may be mentioned polyoxyethylene alkyl ether, polyoxyethylene alkylphenyl ether, polyoxyethylene sorbitan fatty acid esters, ethylene oxide-propylene oxide block copolymers, etc. As to the cationic surfactants, those surfactants mentioned earlier herein can be employed. Anionic surfactants are generally not to be used in view of their conflicting polarity.

The ethylenically unsaturated monomers usable for the production of emulsions according to this invention include vinyl esters such as vinyl acetate, vinyl propionate and vinyl versatate (a higher fatty acid vinyl ester), acrylic acid esters such as methyl acrylate, ethyl acrylate, butyl acrylate, octyl acrylate, etc., methacrylic acid esters such as methyl methacrylate, ethyl methacrylate, etc., vinyl chloride, vinylidene chloride, acrylonitrile, ethylene, styrene, vinyltoluene, chlorostyrene, α-methylstyrene, acrylamide, N-methylolacrylamide, methacrylamide, maleic acid diesters, fumaric acid diesters, itaconic acid diesters, dienes such as butadiene, isoprene, etc., amine-containing monomers, such as dimethylaminoalkyl acrylate, dimethylaminoalkyl methacrylate, dimethylaminoalkyl acrylamide, dimethylaminoalkyl methacrylamide, etc., the corresponding quaternized monomers, 2-hydroxy-3-methacryloxypropyltrimethylammonium chloride and so on. These monomers may be homopolymerized or copolymerized. The emulsion polymerization of monomers including vinyl acetate, particularly the homopolymerization of vinyl acetate, the copolymerization of vinyl acetate and ethylene, the copolymerization of vinyl acetate and acrylic ester, the copolymerization of vinyl acetate and maleic diester, the copolymerization of vinyl acetate and higher fatty acid vinyl ester or the copolymerization of vinyl acetate and vinyl chloride are especially significant for the production of emulsions according to this invention because the above-mentioned cationic group-modified PVA displays especially desirable stabilizing effects in these systems.

The cationic emulsion of this invention is produced by polymerizing said ethylenically unsaturated monomer or monomers in the presence of said cationic group-modified PVA and water under constant agitation, using a conventional polymerization initiator such as hydrogen peroxide, potassium persulfate, ammonium persulfate, t-butyl hydroperoxide or cumene hydroperoxide or a cation-type polymerization initiator such as 2-azobis(2-methylpropamidinium) dihydrochloride, 2-azobis(2'-isopropylimidazolinium) dihydrochloride or the like. While the polymerization initiator mentioned above may be employed alone, it is possible to use the conventional redox system comprising, for example, one of said initiators and a reducing agent such as sodium bisulfite, sodium pyrosulfite, or sodium metasulfite-formaldehyde adduct. These polymerization initiators are preferably used in a proportion of 0.01 to 5 weight percent per 100 weight percent of the ethylenically unsaturated monomer or monomers.

The temperature for the emulsion polymerization according to this invention may range from 30° to 120° C., preferably 40° to 90° C., and the polymerization pH is preferably in the range of 3 to 8. As the pH buffer, a salt such as sodium carbonate, sodium hydrogen carbonate, sodium orthophosphate, sodium dihydrogen phosphate, sodium monohydrogen phosphate, sodium acetate or the like may be advantageously employed in a proportion of 0.05 to 2 weight parts per 100 weight parts of the ethylenically unsaturated monomer. When the cationic group in the cation-modified PVA has the chemical structure of a primary amine, secondary amine, tertiary amine, pyridine, imidazole or the like, it is recommended to control the pH within the range 3 to 8 with acetic acid, formic acid, phosphoric acid, hydrochloric acid or sulfuric acid.

That the particles in the emulsion of this invention are cationic can be verified by reading their electrophoregram which can be measured for example by means of a zeta potential meter wherein the particles are shown to migrate toward the cathode. By measuring the velocity of electrophoretic movement (migration rate), the zeta potential of the emulsion can be calculated. The positive electrophoretic property of emulsion particles is the basis for the cationic character of the emulsion but it has been found that the magnitude of the zeta potential is not necessarily correlated with the various properties of an emulsion which are considered to be derived from its positive polarity. Thus, cationic emulsions exhibiting merely positive electrophoretic behavior are known, though few in number, but the cationic emulsions according to this invention, even though they are comparable to some of those known cationic emulsions in terms of apparent zeta potential, are quite distinct since they possess remarkably improved properties. By way of illustration, if the emulsion according to this invention is diluted and poured over sand, it reacts immediately with the sand to form a film on the sand surface. (The surfaces of sand grains are generally negatively charged in the presence of water.) Of course, such a phenomenon is not observed with anionic or nonionic emulsions; rather, these emulsions will seep into the sand. Such phenomenon is not observed, either, with the commercial cationic emulsions or the cationic emulsions prepared by the known methods or, at best, such phenomenon is not as conspicuous as with the emulsions according to this invention. It is not fully understood why the emulsions of this invention display such properties while the conventional cationic emulsions do not, but it is likely that these effects come from the use of the cationic group-modified PVA as an emulsion stabilizer.

Similarly, the emulsion according to this invention exhibits a very high adhesive affinity for substances tending to be negatively charged, such as pulp, textile fibers, glass, etc. In other words, the emulsion according to this invention features a broad range of application. Thus, it can be used as a paper strength additive of the beater addition type, a binder in the production of nonwoven fabrics, a handle improvement additive for woven fabrics, a fiber treating agent, a household glue, an adhesive, a cementing agent, a coating material, an agricultural mulching material, and a slope reinforcement or other civil engineering or building material in the form of blends with asphalt emulsions.

Having generally described the invention, a more complete understanding can be obtained by reference to certain specific examples, which are provided herein for purposes of illustration only and are not intended to be limiting unless otherwise specified. In these examples, all parts and percents are by weight unless otherwise indicated.

EXAMPLE 1

A 5-liter flask fitted with a stirrer, thermometer, dropping funnel and reflux condenser was charged with 1800 g of vinyl acetate, 2013 g of methanol and 2.5 g of N-(3-dimethylaminopropyl)acrylamide. The flask was purged with nitrogen and heated with stirring on a constant-temperature bath until the internal temperature was increased to 60° C. To this system was added 21 g of 2,2-azobisisobutyronitrile together with 100 g of methanol to initiate the polymerization reaction. During 120 minutes of polymerization, 22 g of N-(3-dimethylaminopropyl)acrylamide and 89 g of a methanol solution containing 8.5 g of acetic acid were added dropwise according to the concentration of solid matter in the system. At the termination of polymerization, the solids content in the system was 33%. The residual vinyl acetate monomer in the system was removed in the conventional manner. The resultant copolymer was found by nuclear magnetic resonance spectrometry to contain 1.0 mol % of N-(3-dimethylaminopropyl)acrylamide units and 99.0 mol % of vinyl acetate units. To 762 g of a 65.5% methanolic solution of this copolymer was added 149 g of methyl acetate, and while stirring at 40° C., 130 ml of a 1 N methanolic solution of sodium hydroxide was added. After thorough mixing, the mixture was allowed to stand. By the end of 4 minutes and 30 seconds, the entire system had undergone gelation. After an additional 20 minutes, the gel was ground in a mill, washed with methanol and dried to give a white polymeric powder. This modified PVA was found by analysis to contain 1 mol % of N-(3-dimethylaminopropyl)acrylamide units with the degree of saponification of vinyl acetate units being 72.0 mol %. The Brookfield viscosity of a 4% aqueous solution of this modified PVA at 20° C. was 8.6 centipoises.

Then, a flask equipped with a stirrer, thermometer, dropping funnel and reflux condenser was charged with 80 g of the above modified PVA and 850 g of distilled water, and after dissolution by stirring and heating, the system was cooled. While stirring, the system was adjusted to pH 4.0 with a 50% aqueous solution of acetic acid. Thereafter, 1000 g of vinyl acetate monomer was added, the temperature was increased to 60° C. and the polymerization reaction was carried out in the presence of an aqueous solution of hydrogen peroxide and an aqueous solution of sodium pyrosulfite as an initiator system. The polymerization reaction was completed in 135 minutes. The cationic polyvinyl acetate emulsion thus obtained contained 51% of resin and showed a Brookfield viscosity of 60 centipoises (at 25° C., Rotor No. 1, 60 r.p.m.). It was also excellent in mechanical stability and dilution stability, and its zeta potential as measured by a zetameter was +28.5 mV.

EXAMPLE 2

In the same manner as Example 1, the copolymer of trimethyl-3-(1-acrylamido-1,1-dimethylpropyl)ammonium chloride and vinyl acetate was saponified to synthesize a modified PVA containing 0.5 mol % of trimethyl-3-(1-acrylamido-1,1-dimethylpropyl)ammonium chloride units, a degree of saponification of vinyl acetate units of 80 mol % and a Brookfield viscosity of 22 cps in 4% aqueous solution at 20° C.

Then, also in the same manner as Example 1, a flask was charged with 80 g of this modified PVA and 950 g of distilled water and, after dissolution and with stirring, the system was adjusted to pH 4.0 with a 50% aqueous solution of acetic acid. Then, 200 g of vinyl acetate monomer was added and at an elevated temperature of 60° C., 6 g of a 60% aqueous solution of hydrogen peroxide was added. The temperature was increased to 70° C. and while this temperature level was maintained, 800 g of vinyl acetate was continuously added dropwise over a period of 3 hours. At 1.5 hours after the start of the polymerization reaction, 4 g of 60% aqueous solution of hydrogen peroxide was added. After the dropwise addition of vinyl acetate had been completed, the temperature was increased to 80° C. and maintained at this level for 30 minutes, followed by cooling to room temperature. The reaction system was adjusted to pH 6.0 with aqueous ammonia. The resulting cationic polyvinyl acetate emulsion had a resin content of 50% and a Brookfield viscosity of 480 centipoises (25° C., Rotor No. 3, 60 r.p.m.). It had excellent mechanical stability and dilution stability and its zeta potential was +26.8 mV.

EXAMPLE 3

The procedure of Example 2 was repeated to synthesize a modified PVA containing 0.2 mol % of trimethyl-3-(1-acrylamido-1,1-dimethylpropyl)ammonium chloride units, a degree of saponification of vinyl acetate units of 81 mol % and a Brookfield viscosity of 8.7 cps in 4% aqueous solution at 20° C.

Then, a pressure-resistant vessel equipped with a stirrer, temperature probe and liquid inlet means was charged with 600 g of the above modified PVA and 10 kg of distilled water and the system was heated and stirred to dissolve the polymer. While stirring, 12 kg of vinyl acetate monomer was added to the above system and while the pressure within the vessel was adjusted to 45 kg/cm$^2$ with ethylene gas, the internal temperature was increased to 60° C. The polymerization reaction was carried out at this temperature using aqueous hydrogen peroxide and aqueous sodium pyrosulfite for 3 hours. After completion of the reaction, the system was adjusted to pH 6.0 with aqueous ammonia. The resulting cationic ethylene-vinyl acetate copolymer emulsion had an ethylene content of 45.0 mol %, a resin concentration of 51.5% and a Brookfield viscosity of 68 centipoises (25° C.; Rotor No. 1, 60 r.p.m.). It was also excellent in mechanical stability and dilution stability, and its zeta potential was +25.7 mV.

EXAMPLE 4

In the same manner as Example 1, there was synthesized a modified PVA containing 2.0 mol % of N-(1,1-dimethyl-3-dimethylaminopropyl)acrylamide units and with a degree of saponification of vinyl acetate units of 79 mol % and a Brookfield viscosity of 13.8 cps in 4% aqueous solution at 20° C.

Then, a pressure-resistant vessel equipped with a stirrer, temperature probe and liquid inlet means was charged with 740 g of a 5.4% aqueous solution of the above modified PVA and 800 g of vinyl acetate monomer, and while the internal pressure was controlled at 50 kg/cm$^2$ with ethylene gas, the temperature of the system was increased to 60° C. At this temperature, the polymerization reaction was initiated by addition of an aqueous solution of hydrogen peroxide and an aqueous solution of sodium pyrosulfite. After 2 hours of polymerization, the reaction system was cooled to room temperature.

The resulting cationic ethylene-vinyl acetate copolymer emulsion had an ethylene content of 47 mol %, a resin concentration of 50% and a Brookfield viscosity of 120 cps at 25° C. (Rotor No. 2, 60 r.p.m.). It was excellent in mechanical stability and dilution stability, and had a zeta potential of +23.7 mV.

EXAMPLE 5

In the same manner as Example 2, there was synthesized a modified PVA containing 1.0 mol % of trimethyl-3-(1-acrylamido-1,1-dimethylpropyl)ammonium chloride units and with a degree of saponification of vinyl acetate units of 70 mol % and a Brookfield viscosity of 10.3 cps in 4% aqueous solution at 20° C.

A 5-liter flask fitted with a stirrer, thermometer, dropping funnel and reflux condenser was charged with 450 g of a 10% aqueous solution of the above modified PVA, 9 g of ethyl acrylate and 51 g of vinyl acetate, and after the mixture was thoroughly emulsified, 43 g of 5.7% aqueous ammonium persulfate and 46 g of 13% aqueous sodium bisulfite were added to initiate a polymerization reaction.

While the temperature of the system was maintained at 60° C., a mixture of 81 g of ethyl acrylate and 459 g of vinyl acetate and 80 g of a 2% aqueous solution of ammonium persulfate were added dropwise over a period of 3 hours. After completion of the dropwise addition, the temperature was increased to 70° C. and maintained at that level for 30 minutes followed by cooling to room temperature. The reaction mixture was then adjusted to pH 5.0 with 10% aqueous ammonia. The resulting cationic vinyl acetate-ethyl acrylate copolymer emulsion had a resin content of 50%, a Brookfield viscosity of 112 cps at 25° C. (Rotor No. 2, 60 r.p.m.) and a zeta potential of +21.0 mV.

EXAMPLE 6

A flask equipped with a stirrer, thermometer and dropping funnel was charged with 450 g of a 9.6% aqueous solution of the modified PVA containing 1.0 mol % of trimethyl-3-(1-acrylamido-1,1-dimethylpropyl)ammonium chloride units (synthesized in Example 5), 42 g vinyl acetate and 18 g of vinyl versatate (Shell Chemical, VeoVa-10 ®), and after the mixture was thoroughly emulsified, 43 g of 6% aqueous ammonium persulfate and 46 g of 13% aqueous sodium bisulfite were added to initiate a polymerization reaction. While the temperature of the system was maintained at 60° C., a mixture of 378 g of vinyl acetate and 162 g of vinyl versatate and 90 g of a 2% aqueous solution of ammonium persulfate were added over a period of 3 hours to effect a polymerization reaction. After completion of the dropwise addition, the temperature was increased to 70° C. and maintained at this level for 40 minutes followed by cooling to room temperature. The reaction mixture was then adjusted to pH 5.0 with 10% aqueous ammonia. The resulting cationic vinyl acetate-vinyl versatate copolymer emulsion had a resin content of 50%, a Brookfield viscosity of 106 cps at 25° C. (Rotor No. 2, 60 r.p.m.) and a zeta potential of +29.8 mV.

EXAMPLE 7

A flask fitted with a stirrer, thermometer and dropping funnel was charged with 450 g of a 10% aqueous solution of the modified PVA containing 1.0 mol % of trimethyl-3-(1-acrylamido-1,1-dimethylpropyl)ammonium chloride units (synthesized in Example 5), 45 g of vinyl acetate and 15 g of di-n-butyl maleate, and after the mixture was thoroughly emulsified, 43 g of 7% aqueous ammonium persulfate and 48 g of 16% aqueous sodium bisulfite were added to initiate a polymerization reaction. With the temperature of the system being maintained at 60° C., a mixture of 405 g of vinyl acetate and 135 g of di-n-butyl maleate and 93 g of a 2.5% aqueous solution of ammonium persulfate were added dropwise over a period of 3.5 hours. After completion of the dropwise addition, the temperature was increased to 70° C. and maintained at this temperature for 50 minutes. The system was then cooled to room temperature and adjusted to pH 5.0 with 10% aqueous ammonia. The resulting cationic vinyl acetate-di-n-butyl maleate copolymer emulsion had a resin content of 50%, a Brookfield viscosity of 98 cps at 25° C. (Rotor No. 2, 60 r.p.m.) and a zeta potential of +25.7 mV.

EXAMPLE 8

A pressure-resistant reaction vessel equipped with a stirrer and temperature probe was charged with 660 g of a 2.6% aqueous solution of the modified PVA containing 1.0 mol % of trimethyl-3-(1-acrylamido-1,1-dimethylpropyl)ammonium chloride units (synthesized in Example 5), 500 g of vinyl chloride monomer, 6 g of polyoxyethylene nonylphenyl ether and 0.9 g of potassium persulfate. The vessel was sealed and the polymerization reaction was conducted, with stirring, at 45° C. for 13 hours. The reaction mixture was then cooled to room temperature. The resulting cationic vinyl chloride emulsion had a resin concentration of 30%, a Brookfield viscosity of 22 cps at 25° C. (Rotor No. 1, 60 r.p.m.) and a zeta potential of +24.0 mV.

EXAMPLE 9

A flask fitted with a stirrer, thermometer and dropping funnel was charged with 240 g of a 10% aqueous solution of the modified PVA containing 1.0 mol % of trimethyl-3-(1-acrylamido-1,1-dimethylpropyl)ammonium chloride units (synthesized in Example 5), 16 g of polyoxyethylene lauryl ether emulsifier, 0.6 g of N-methylolacrylamide, 29.4 g of ethyl acrylate and 30 g of methyl methacrylate, and after the mixture was thoroughly emulsified, 47 g of an emulsion containing 4 g of polyoxyethylene lauryl ether emulsifier, and 3 g of cumene hydroperoxide, and 43 g of an aqueous solution containing 3 g of anhydrous sodium pyrophosphate were added to initiate a polymerization reaction. With the temperature of the system being maintained at 60° C., 54 g of a 10% aqueous solution of N-methylol acrylamide, a mixture of 264.6 g of ethyl acrylate and 270 g of methyl methacrylate, 142 g of an emulsion containing 4 g of polyoxyethylene lauryl ether emulsifier and 1.8 g of cumene hydroperoxide, and 100 g of a 1.8% aqueous solution of anhydrous sodium pyrophosphate were added dropwise over a period of 3 hours to effect a polymerization reaction. After completion of the dropwise addition, the temperature was increased to 70° C., maintained at that temperature for one hour and reduced to room temperature. The reaction system was then adjusted to pH 5.0 with 10% aqueous ammonia. The resulting cationic ethyl acrylate-methyl methacrylate-N-methylol acrylamide terpolymer emulsion had a resin concentration of 40%, a Brookfield viscosity of 113 cps at 25° C. (Rotor No. 2, 60 r.p.m.) and a zeta potential of +19.7 mV.

EXAMPLE 10

In an 8% aqueous solution of sodium hydroxide was immersed 20.1 g of commercial PVA (Kuraray Poval ® PVA-117) at room temperature for one hour, after which the liquid was filtered off. The wet PVA was put in a flask and 20.3 g of glycidyltrimethylammonium chloride (Shell Chemical, G-MAC) was added. The reaction was carried out at 50° C. for 8 hours with stirring. After cooling to room temperature, the mixture was neutralized with acetic acid, washed with 70% aqueous methanol and dried to give a powder. This polymer containing 0.7% of nitrogen and was considered to be a G-MAC-modified cationic PVA.

A flask fitted with a stirrer, thermometer, dropping funnel and reflux condenser was charged with 780 g of a 10% aqueous solution of the above modified PVA, 20 g of polyoyethylene nonylphenyl ether and 1000 g of vinyl acetate, and after the mixture was thoroughly emulsified, the temperature was increased to 60° C. With the addition of aqueous hydrogen peroxide and aqueous sodium pyrosulfite, the polymerization reaction was carried out for 3 hours.

The reaction mixture was then adjusted to pH 6.0 with aqueous ammonia. The cationic polyvinyl acetate emulsion thus obtained had a Brookfield viscosity of 460 cps at 25° C. (Rotor No. 3, 60 r.p.m.) and a zeta potential of +18.6 mV.

EXAMPLE 11

A reaction vessel equipped with a stirrer, thermometer, dropping funnel and reflux condenser was charged with 1400 parts of vinyl acetate and 2500 parts of methanol, as well as 1.0 part of N-(3-dimethylaminopropyl)-methacrylamide and a neutralizing amount of acetic acid. The vessel was placed on a constant-temperature bath, and after the atmosphere in the system was purged with nitrogen gas while stirring, the internal temperature was increased to 60° C. To this system was added 23 parts of 2,2'-azobisisobutyronitrile together with 100 parts of methanol. The polymerization reaction was conducted for 160 minutes, during which time 8 parts of N-(3-dimethylaminopropyl)methacrylamide and 32 parts of methanol containing a sufficient amount of acetic acid to neutralize the amide were added dropwise in accordance with the solids content in the system. The solids content in the system at the end of the polymerization period was 25.9%. The residual vinyl acetate monomer was removed from the system in the conventional manner.

Nuclear magnetic resonance spectrometry and analysis for N revealed that this copolymer contained 0.4 mol % of N-(3-dimethylaminopropyl)methacrylamide units and 99.6 mol % of vinyl acetate units. To 414 parts of a 65% methanol solution of the above copolymer was added 79 parts of methyl acetate, and while stirring at 40° C., a saponification reaction was effected by addition of 28 parts of a 1 N-methanol solution of sodium hydroxide. The resulting gel was crushed, washed with methanol and dried to give a white polymeric powder. This modified PVA contained 0.4 mol % of N-(3-dimethylaminopropyl)methacrylamide units, with the degree of saponification of vinyl acetate units being 80 mol %. The Brookfield viscosity of a 4% aqueous solution of this modified PVA at 20° C. was 7.3 cps.

A reaction vessel fitted with a stirrer, thermometer, dropping funnel and reflux condenser was charged with 80 parts of the above modified PVA and 850 parts of distilled water, and with stirring, the temperature was increased to dissolve the polymer followed by cooling. The pH of the system was adjusted to 4.0 with a 50% aqueous solution of acetic acid while stirring. Then, 1000 parts of vinyl acetate monomer were added, the temperature was increased to 60° C., and with the addition of aqueous hydrogen peroxide and aqueous sodium pyrosulfite, the emulsion polymerization was carried out for 135 minutes. The resulting cationic polyvinyl acetate emulsion had a resin content of 50% and a Brookfield viscosity of 98 cps at 25° C. It was excellent in mechanical stability and dilution stability, and had a zeta potential of +10.2 mV.

EXAMPLE 12

A reaction vessel fitted with a stirrer, thermometer, dropping funnel and reflux condenser was charged with 2500 parts of vinyl acetate, 1000 parts of methanol and 2.2 parts of trimethyl-3-(1-methacrylamidopropyl)ammonium chloride. The vessel was placed on a constant-temperature bath and after the atmosphere within the system was purged with nitrogen gas while stirring, the internal temperature was increased to 60° C. The polymerization reaction was initiated by the addition of 3.0 parts of 2,2'-azobisisobutyronitrile and 71 parts of methanol. The polymerization was continued for 140 minutes, during which time 54 parts of a 25% methanol solution of trimethyl-3-(1-methacrylamidopropyl)ammonium chloride was added dropwise in accordance with the solids content of the system. The concentration of solids in the system at the end of polymerization was 39.5%. The residual vinyl acetate monomer was removed from the system in the conventional manner. This copolymer was saponified by the procedure described in Example 11 to obtain a white modified PVA powder. This modified PVA contained 0.4 mol % of trimethyl-3-(1-methacrylamidopropyl)ammonium chloride units, with the degree of saponification of vinyl acetate units being 80 mol %. The Brookfield viscosity of a 4% aqueous solution of the modified PVA at 20° C. was 20.0 cps.

In a reaction vessel equipped with a stirrer, thermometer, dropping funnel and reflux condenser, 80 parts of the above modified PVA was dissolved in 950 parts of distilled water and while stirring, the solution was adjusted to pH 4.0 with a 50% aqueous solution of acetic acid. Then, 200 parts of vinyl acetate monomer were added, the temperature was increased to 60° C., 6 parts of a 60% aqueous solution of hydrogen peroxide were added and the temperature was increased to 70° C. With this temperature being maintained, 800 parts of vinyl acetate were continuously added dropwise over a period of 3 hours, with the addition of 4 parts of aqueous hydrogen peroxide at 1.5 hours after start of polymerization. At completion of the dropwise addition of vinyl acetate, the temperature was increased to 80° C. and maintained at this level for 30 minutes followed by cooling to room temperature, and the reaction mixture was adjusted to pH 6.0 with aqueous ammonia. The resulting cationic polyvinyl acetate emulsion had a resin concentration of 50% and a Brookfield viscosity of 510 cps at 25° C. It was also excellent in mechanical stability and dilution stability, and had a zeta potential of +26.4 mV.

EXAMPLE 13

In the same manner as Example 12, there was synthesized a modified PVA containing 0.2 mol % of trimethyl-3-(1-methacrylamidopropyl)ammonium chloride units having a degree of saponification of vinyl acetate units of 81 mol % and a Brookfield viscosity of 8.6 cps in 4% aqueous solution at 20° C.

A pressure-resistant reaction vessel equipped with a stirrer, temperature probe and liquid inlet means was charged with 600 parts of the above modified PVA and 10,000 parts of distilled water, and the modified PVA was dissolved at an elevated temperature and with stirring. After cooling and with stirring, 12,000 parts of vinyl acetate monomer was added and while the pressure in the system was controlled at 45 kg/cm$^2$ by the introduction of ethylene gas, the temperature was increased to 60° C. At this temperature, with the addition of aqueous hydrogen peroxide and aqueous sodium pyrosulfite, the emulsion polymerization was conducted for 3 hours, after which the reaction mixture was adjusted to pH 6.0 with aqueous ammonia. The resulting cationic ethylene-vinyl acetate copolymer emulsion had an ethylene content of 45.4 mol %, a resin concentration of 50% and a Brookfield viscosity of 61 cps at 25° C. It was excellent in mechanical stability and dilution stability, and had a zeta potential of +27.0 mV.

EXAMPLE 14

In the same manner as Example 11, there was synthesized a modified PVA containing 0.6 mol % of N-(3-dimethylaminopropyl)methacrylamide units having a degree of saponification of vinyl acetate units of 79 mol % and a Brookfield viscosity of 14.2 cps in 4% aqueous solution at 20° C.

A pressure-resistant reaction vessel equipped with a stirrer, temperature probe and liquid inlet means was charged with 740 parts of a 5.4% aqueous solution of the above modified PVA and 800 parts of vinyl acetate monomer, and while the pressure was maintained at 50 kg/cm$^2$ by the introduction of ethylene gas, the system temperature was increased to 60° C. Then, with the addition of aqueous hydrogen peroxide and aqueous sodium pyrosulfite, the polymerization was conducted for 2 hours, at the end of which time the reaction mixture was cooled to room temperature. The resulting cationic ethylene-vinyl acetate copolymer emulsion had an ethylene content of 46 mol %, a resin concentration of 50% and a Brookfield viscosity of 105 cps at 25° C. It was excellent in mechanical stability and dilution stability, and had a zeta potential of +28.7 mV.

EXAMPLE 15

In the same manner as Example 12, there was synthesized a modified PVA containing 1.5 mol % of trimethyl-3-(1-methacrylamidopropyl)ammonium chloride units and having a degree of saponification of vinyl acetate units of 70 mol % and a Brookfield viscosity of 11.0 cps in 4% aqueous solution at 20° C.

A reaction vessel equipped with a stirrer, thermometer, dropping funnel and reflux condenser was charged with 450 parts of a 10% aqueous solution of the above modified PVA, 9 parts of ethyl acrylate and 51 parts of vinyl acetate and after the mixture was thoroughly emulsified, the polymerization reaction was conducted with the addition of 43 parts of 5.7% ammonium persulfate and 46 parts of 13% sodium bisulfite.

While the temperature of the system was maintained at 60° C., a mixture of 81 parts of 2% aqueous ammonium persulfate were added dropwise to conduct an emulsion polymerization for 3 hours. After completion of the dropwise addition, the temperature was increased to 70° C. and maintained at that temperature for 30 minutes followed by cooling to room temperature. The reaction mixture was then adjusted to pH 5.0 with 10% aqueous ammonia. The resulting cationic vinyl acetate-ethyl acrylate copolymer emulsion had a resin concentration of 50%, a Brookfield viscosity of 130 cps at 25° C. and a zeta potential of +11.5 mV.

EXAMPLE 16

A reaction vessel equipped with a stirrer, thermometer and dropping funnel was charged with 450 parts of a 9.6% aqueous solution of the modified PVA of Example 5, 42 parts of vinyl acetate and 18 parts of vinyl versatate (Shell Chemical, VeoVa-10 ®), and after the mixture was thoroughly emulsified, the polymerization reaction was initiated by the addition of 43 parts of 6% aqueous ammonium persulfate and 46 parts of 13% aqueous sodium bisulfite. While the temperature of the system was maintained at 60° C., the polymerization was conducted for 3 hours with the dropwise addition of a mixture of 378 parts of vinyl acetate and 162 parts vinyl versatate and 90 parts of a 2% aqueous solution of ammonium persulfate.

After completion of the dropwise addition, the temperature was increased to 70° C. and held at that level for 40 minutes followed by cooling to room temperature. The mixture was then adjusted to pH 5.0 with 10% aqueous ammonia. The resulting cationic vinyl acetate-vinyl versatate copolymer emulsion had a resin content of 50%, a Brookfield viscosity of 98 cps at 25° C. and a zeta potential of +28.3 mV.

EXAMPLE 17

A reaction vessel equipped with a stirrer, thermometer and dropping funnel was charged with 450 parts of a 10% aqueous solution of the modified PVA synthesized in Example 15, 45 parts of vinyl acetate and 15 parts of di-n-butyl maleate, and after the mixture was thoroughly emulsified, the polymerization reaction was initiated by the addition of 43 parts of 7% aqueous ammonium persulfate and 48 parts of 16% aqueous sodium bisulfite. With the temperature of the system being maintained at 60° C., the polymerization reaction was conducted for 3.5 hours with the dropwise addition of a mixture of 405 parts of vinyl acetate and 135 parts of di-n-butyl maleate and 93 parts of a 2.5% aqueous solution of ammonium persulfate. After completion of the dropwise addition, the temperature was raised to 70° C. and held at this level for 50 minutes followed by cooling to room temperature.

The reaction mixture was then adjusted to pH 5.0 with 10% aqueous ammonia. The resulting cationic vinyl acetate-di-n-butyl maleate copolymer emulsion had a resin content of 50%, a Brookfield viscosity of 95 cps at 25° C. and a zeta potential of +28.4 mV.

EXAMPLE 18

In the same manner as Example 12, there was synthesized a modified PVA containing 0.8 mol % of trimethyl-3-(1-methacrylamidopropyl)ammonium chloride units having a degree of saponification of vinyl acetate units of 84 mole % and a Brookfield viscosity of 13.8 cps in 4% aqueous solution at 20° C.

A pressure-resistant reaction vessel equipped with a stirrer and temperature probe was charged with 660 parts of a 2.6% aqueous solution of the above modified PVA, 500 parts of vinyl chloride monomer, 6 parts of polyoxyethylene nonylphenyl ether and 0.9 part of potassium persulfate. The vessel was sealed, and the polymerization reaction was conducted at 45° C. for 13 hours with stirring. The reaction mixture was then cooled to room temperature. The resulting cationic polyvinyl chloride emulsion had a resin concentration of 30%, a Brookfield viscosity of 26 cps at 25° C. and a zeta potential of +20.5 mV.

EXAMPLE 19

A reaction vessel equipped with a stirrer, thermometer and dropping funnel was charged with 420 parts of a 10% aqueous solution of the modified PVA synthesized in Example 18, 16 parts of polyoxyethylene lauryl ether emulsifier, 0.6 part of N-methylolacrylamide, 29.4 parts of ethyl acrylate and 30 parts of methyl methacrylate.

After the mixture was thoroughly emulsified, 47 parts of an emulsion containing 4 parts of polyoxyethylene lauryl ether emulsifier and 3 parts of cumene hydroperoxide and 43 parts of an aqueous solution containing 3 parts of anhydrous sodium pyrophosphate were added. With the temperature of the system being maintained at 60° C., the polymerization reaction was carried out for 3 hours with the dropwise addition of 54 parts of a 10% aqueous solution of N-methylolacrylamide, a mixture of 264.6 parts of ethyl acrylate and 270 parts of methyl methacrylate, 142 parts of an emulsion containing 4 parts of polyoxyethylene lauryl ether emulsifier and 1.8 parts of cumene hydroperoxide and 100 parts of a 1.8% aqueous solution of anhydrous sodium pyrophosphate. After completion of the dropwise addition, the temperature was increased to 70° C. and held at that level for an hour followed by cooling to room temperature. The reaction system was then adjusted to pH 5.0 with 10% aqueous ammonia. The resulting cationic ethyl acrylate-methyl methacrylate-N-methylolacrylamide terpolymer emulsion had a resin contact of 40%, a Brookfield viscosity of 130 cps at 25° C. and a zeta potential of +23.4 mV.

EXAMPLE 20

In the same manner as Example 12, there was synthesized a modified PVA containing 3 mol % of trimethyl-3-(1-methacrylamidopropyl)ammonium chloride units and with a degree of saponification of vinyl acetate units of 65 mol % and a Brookfield viscosity of 15.5 cps in 4% aqueous solution at 20° C.

A reaction vessel equipped with a stirrer, thermometer, dropping funnel and reflux condenser was charged with 930 parts of a 9.3% aqueous solution of the above modified PVA and 1000 parts of vinyl acetate monomer, and with the addition of aqueous hydrogen peroxide and aqueous sodium pyrosulfite, the polymerization reaction was carried out for 135 minutes at 60° C. The resulting cationic polyvinyl acetate emulsion had a resin content of 50%, a Brookfield viscosity of 109 cps at 25° C. and a zeta potential of +27.4 mV.

EXAMPLE 21

A reaction vessel equipped with a stirrer, thermometer, dropping funnel and reflux condenser was charged with 1400 parts of vinyl acetate, 2500 parts of methanol and a mixture of 1.7 parts of 1-vinyl-2-methylimidazole and a neutralizing amount of acetic acid. The vessel was placed on a constant-temperature bath and after the atmosphere within the system was purged with nitrogen gas while stirring, the internal temperature was increased to 60° C. The polymerization reaction was initiated by the addition of 21 g of 2,2'-azobisisobutyronitrile and 100 g of methanol. The reaction was carried out for 150 minutes, during which time 10 parts of 1-vinyl-2-methylimidazole and 41 parts of a methanol solution containing a sufficient amount of acetic acid to neutralize the base were added dropwise.

The solids content of the system at the end of the polymerization period was 26.4%. The residual vinyl acetate monomer was removed from the system in the conventional manner.

Nuclear magnetic resonance spectrometry and analysis for N showed that this copolymer contained 0.4 mol % of 1-vinyl-2-methylimidazole units, and 99.6 mol % of vinyl acetate units.

To 396 parts of a 68% methanol solution of this copolymer was added 119 parts of methyl acetate and while the mixture was stirred at 40° C., the saponification reaction was effected by the addition of 70 parts of a 1 N methanol solution of sodium hydroxide. The resulting gel was crushed, washed with methanol and dried to give a white polymeric powder. This modified PVA contained 0.4 mol % of 1-vinyl-2-methylimidazole units and had a degree of saponification of vinyl acetate units of 78 mol %.

As a 4% aqueous solution, this modified PVA had a Brookfield viscosity of 7.1 cps at 20° C.

A reaction vessel equipped with a stirrer, thermometer, dropping funnel and reflux condenser was charged with 80 parts of the above modified PVA and 850 parts of distilled water and after the polymer was dissolved at an increased temperature, the solution was cooled. While stirring, the solution was adjusted to pH 4.0 with a 50% aqueous solution of acetic acid followed by addition of 1000 parts of vinyl acetate monomer. The temperature was increased to 60° C. and after addition of aqueous sodium pyrosulfite, the emulsion polymerization was carried out for 135 minutes. The resulting cationic polyvinyl acetate emulsion had a resin content of 50% and a Brookfield viscosity of 71 cps at 25° C. It was excellent in mechanical stability and dilution stability, and had a zeta potential of +9.8 mV.

EXAMPLE 22

A reaction vessel equipped with a stirrer, thermometer, dropping funnel and reflux condenser was charged with 2000 parts of vinyl acetate, 757 parts of methanol and 3.5 parts of 1-vinyl-2,3-dimethylimidazolinium chloride. The vessel was placed on a constant-temperature bath and after the atmosphere within the system was purged with nitrogen gas while stirring, the internal temperature was increased to 60° C. The polymerization reaction was initiated by addition of 3.1 parts of 2,2'-azobisisobutyronitrile and 100 parts of methanol. During a polymerization time of 140 minutes, 26 parts of a 25% methanol solution of 1-vinyl-2,3-dimethylimidazolinium chloride was added in accordance with the solids content of the system. The concentration of solids in the system at termination of polymerization was 40.3%. After the residual vinyl acetate monomer was removed in the conventional manner, the resulting copolymer was saponified in the same manner as Example 21 to give a white modified PVA powder. This modified PVA contained 0.4 mol % of 1-vinyl-2,3-dimethylimidazolinium chloride units, with the degree of saponification of vinyl acetate units being 80 mol %. As a 4% aqueous solution, this modified PVA had a Brookfield viscosity of 22.1 cps at 20° C.

In a reaction vessel equipped with a stirrer, thermometer, dropping funnel and reflux condenser, 80 parts of the above modified PVA was dissolved in 950 parts of distilled water and, while stirring, the solution was adjusted to pH 4.0 with a 50% aqueous solution of acetic acid. Then, 200 parts of vinyl acetate monomer were added, the temperature was increased to 60° C., 6 parts of a 60% aqueous solution of hydrogen peroxide were added and the temperature was increased to 70° C. While this temperature was maintained, 800 parts of vinyl acetate were continuously added dropwise to conduct an emulsion polymerization.

After 1.5 hours of emulsion polymerization, 4 parts of aqueous hydrogen peroxide solution were added. After completion of the dropwise addition of vinyl acetate, the temperature was increased to 80° C. and maintained at this level for 30 minutes followed by cooling to room temperature. The reaction mixture was then adjusted to pH 6.0 with aqueous ammonia. The resulting cationic polyvinyl acetate emulsion had a resin content of 50% and a Brookfield viscosity of 450 cps at 25° C. It was excellent in mechanical stability and dilution stability, and had a zeta potential of +25.9 mV.

EXAMPLE 23

In the same manner as Example 22, there was synthesized a modified PVA containing 0.2 mol % of 1-vinyl-2,3-dimethylimidazolinium chloride units having a degree of saponification of vinyl acetate units of 81 mol % and a Brookfield viscosity of 8.6 cps as measured in 4% aqueous solution at 20° C.

A pressurizable reaction vessel equipped with a stirrer, temperature probe and liquid inlet means was charged with 600 parts of the above modified PVA and 10,000 parts of distilled water and the polymer was dissolved at an elevated temperature and with stirring. After cooling and with stirring, 12,000 parts of vinyl acetate monomer were added, and while ethylene gas was introduced to maintain the internal pressure at 45 kg/cm$^2$, the internal temperature was increased to 60° C. At this temperature, aqueous hydrogen peroxide solution and aqueous sodium pyrosulfite solution were added to effect an emulsion polymerization. After completion of the polymerization reaction, the reaction mixture was adjusted to pH 6.0 with aqueous ammonia. The resulting cationic ethylenevinyl acetate copolymer emulsion had an ethylene content of 15.2 mol %, a resin concentration of 50% and a Brookfield viscosity of 63 cps at 25° C. It was excellent in mechanical stability and dilution stability, and had a zeta potential of +26.3 mV.

EXAMPLE 24

In the same manner as Example 21, there was synthesized a modified PVA containing 0.6 mol % of 1-vinyl-2-methylimidazole units having a degree of saponification of vinyl acetate units of 79 mol % and a Brookfield viscosity of 14.2 cps as measured in 4% aqueous solution at 20° C.

A pressurizable reaction vessel equipped with a stirrer, temperature probe and liquid inlet means was charged with 740 parts of a 5.4% aqueous solution of the above modified PVA and 800 parts of vinyl acetate monomer, and while the internal pressure of the system was maintained at 50 kg/cm$^2$ by the introduction of ethylene gas, the internal temperature was increased to 60° C. With the addition of aqueous hydrogen peroxide solution and aqueous sodium pyrosulfite solution, the polymerization reaction was carried out for 2 hours, at the end of which time the reaction system was cooled to room temperature.

The resulting cationic ethylene-vinyl acetate copolymer emulsion had an ethylene content of 47 mol %, a resin concentration of 50% and a Brookfield viscosity of 128 cps at 25° C. It was excellent in mechanical stability and dilution stability, and had a zeta potential of +25.8 mV.

EXAMPLE 25

In the same manner as Example 22, there was synthesized a modified PVA containing 1.5 mol % of 1-vinyl-2,3-dimethylimidazolinium chloride units, and with a degree of saponification of vinyl acetate units, of 71 mole % and a Brookfield viscosity of 10.2 cps as measured in 4% aqueous solution at 20° C.

A reaction vessel equipped with a stirrer, thermometer, dropping funnel and reflux condenser was charged with 450 parts of a 10% aqueous solution of the above modified PVA, 9 parts of ethyl acrylate and 51 parts of vinyl acetate, and after the mixture was thoroughly emulsified, 43 parts of 5.7% ammonium persulfate and 46 parts of 13% sodium bisulfite were added to initiate a polymerization reaction.

With the internal temperature of the system being maintained at 60° C., a mixture of 81 parts of ethyl acrylate and 459 parts of vinyl acetate and 80 parts of a 2% aqueous solution of ammonium persulfate were added dropwise. The emulsion polymerization was conducted for 3 hours. After completion of the dropwise addition, the system was heated to 70° C. and maintained at this temperature for 30 minutes followed by cooling to room temperature. The reaction mixture was then adjusted to pH 5.0 with 10% aqueous ammonia. The resulting cationic vinyl acetate-ethyl acrylate copolymer emulsion had a resin content of 50%, a Brookfield viscosity of 121 cps at 25° C., and a zeta potential of +10.1 mV.

EXAMPLE 26

A reaction vessel equipped with a stirrer, thermometer and dropping funnel was charged with 450 parts of a 9.6% aqueous solution of the modified PVA synthesized in Example 25, 42 parts of vinyl acetate and 18 parts of vinyl versatate (Shell Chemical: VeoVa-10 ®) and after the mixture was thoroughly emulsified, the polymerization reaction was initiated by addition of 43 parts of a 6% aqueous solution of ammonium persulfate and 46 parts of a 13% aqueous solution of sodium bisulfite. With the internal temperature of the system being maintained at 60° C., a mixture of 378 parts of vinyl acetate and 162 parts of vinyl versatate and 90 parts of 2% aqueous ammonium persulfate solution were added dropwise over a period of 3 hours. After completion of the dropwise addition, the reaction system was heated to 70° C. and maintained at this temperature for 40 minutes followed by cooling to room temperature. The reaction mixture was then adjusted to pH 5.0 with 10% aqueous ammonia. The resulting cationic vinyl acetate-vinyl versatate copolymer emulsion had a resin content of 50%, a Brookfield viscosity of 101 cps at 25° C., and a zeta potential of +27.4 mV.

EXAMPLE 27

A reaction vessel equipped with a stirrer, thermometer and dropping funnel was charged with 450 parts of a 10% aqueous solution of the modified PVA synthesized in Example 25, 45 parts of vinyl acetate and 15 parts of di-n-butyl maleate and after the mixture was thoroughly emulsified, the polymerization reaction was initiated by addition of 43 parts of 7% aqueous ammonium persulfate solution and 48 parts of 16% aqueous sodium bisulfite solution. With the internal temperature of the system being maintained at 60° C., a mixture of 405 parts of vinyl acetate and 135 parts of di-n-butyl maleate and 93 parts of 3.5% aqueous ammonium persulfate solution were added dropwise to conduct a polymerization reaction for 3.5 hours. After completion of the dropwise addition, the temperature was increased to 70° C. and maintained at that level for 50 minutes followed by cooling to room temperature.

The reaction mixture was adjusted to pH 5.0 with 10% aqueous ammonia. The resulting cationic vinyl acetate-di-n-butyl maleate copolymer emulsion had a resin content of 50%, a Brookfield viscosity of 98 cps at 25° C. and a zeta potential of +26.3 mV.

EXAMPLE 28

In the same manner as Example 22, there was synthesized a modified PVA containing 0.8 mol % of 1-vinyl-2,3-dimethylimidazolinium chloride units having a degree of saponification of vinyl acetate units of 85 mol % and a Brookfield viscosity of 14.1 cps as measured in 4% aqueous solution at 20° C.

A pressure-resistant reaction vessel equipped with a stirrer and temperature probe was charged with 660 parts of a 2.6% aqueous solution of the above modified PVA, 500 parts of vinyl chloride monomer, 6 parts of polyoxyethylene nonylphenyl ether and 0.9 part of potassium persulfate. The vessel was sealed, and the polymerization reaction was continued at 45° C. for 13 hours, with stirring, followed by cooling. The resulting cationic polyvinyl chloride emulsion had a resin concentration of 30%, a Brookfield viscosity of 24 cps at 25° C. and a zeta potential of +23.5 mV.

EXAMPLE 29

A reaction vessel equipped with a stirrer, thermometer and dropping funnel was charged with 420 parts of a 10% aqueous solution of the modified PVA synthesized in Example 28, 16 parts of polyoxyethylene lauryl ether emulsifier, 0.6 part of N-methylolacrylamide, 29.4 parts of ethyl acrylate and 30 parts of methyl methacrylate. After the mixture had been sufficiently emulsified, 47 parts of an emulsion containing 4 parts of polyoxyethylene lauryl ether emulsifier and 3 parts of cumene hydroperoxide and 43 parts of an aqueous solution containing 3 parts of anhydrous sodium pyrophosphite were added to initiate a polymerization reaction. With the internal temperature of the system being maintained at 60° C., 54 parts of a 10% aqueous solution of N-methylolacrylamide, a mixture of 264.6 parts of ethyl acrylate and 270 parts of methyl methacrylate, 142 parts of an emulsion containing 4 parts of polyoxyethylene lauryl ether emulsifier and 1.8 parts of cumene hydroperoxide, and 100 parts of a 1.8% aqueous solution of anydrous sodium pyrophosphate were added dropwise. In this manner, the polymerization reaction was carried out for 3 hours. After completion of the dropwise addition, the temperature was increased to 70° C. and maintained at that level for one hour followed by cooling to room temperature. The reaction mixture was then adjusted to pH 5.0 with 10% aqueous ammonia. The resulting cationic ethyl acrylate-methyl methacrylate-N-methylolacrylamide terpolymer emulsion had a resin content of 40%, a Brookfield viscosity of 125 cps at 25° C. and a zeta potential of +21.8 mV.

EXAMPLE 30

The procedure of Example 22 was repeated except that 1-vinyl-3-methylimidazolinium chloride was used in lieu of 1-vinyl-2,3-dimethylimidazolinium chloride to obtain a modified PVA containing 0.3 mol % of 1-vinyl-3-methylimidazolinium chloride units having a degree of saponification of vinyl acetate units of 83 mol % and a Brookfield viscosity of 15.0 cps as measured in 4% aqueous solution oat 20° C.

A reaction vessel equipped with a stirrer, thermometer, dropping funnel and reflux condenser was charged with 930 parts of a 9.3% aqueous solution of the above modified PVA and 1000 parts of vinyl acetate monomer, the temperature was increased to 60° C., and aqueous hydrogen peroxide and aqueous sodium pyrosulfite were added to initiate a polymerization reaction. The reaction was continued for 135 minutes. The resulting cationic polyvinyl acetate emulsion had a resin content of 50%, a Brookfield viscosity of 98 cps at 25° C. and a zeta potential of +26.8 mV.

Control Example 1

The procedure of Example 21 was repeated except that the modified PVA was replaced with an unmodified PVA having a degree of saponification of 88 mol % and a viscosity of 8.0 cps as measured in 4% aqueous solution at 20° C., to prepare a polyvinyl acetate emulsion. This emulsion had a resin content of 50%, a Brookfield viscosity of 80 cps at 25° C. and a zeta potential of −25.0 mV which means that it was an anionic emulsion.

Control Example 2

In the presence of 2-hydroxy-3-methacryloxypropyl-trimethylammonium chloride-vinyl acetate copolymer, vinyl acetate was emulsion-polymerized to obtain a cationic polyvinyl acetate emulsion.

Control Example 3

In the presence of polyamine polyamide epichlorohydrin, vinyl acetate was emulsion-polymerized to give a cationic polyvinyl acetate emulsion.

EXAMPLE 31

The following table shows the phenomena which occurred when dilutions (resin concentration 10%) of the emulsions prepared in the Examples and Control Examples were poured over sand.

| Emulsion | Zeta potential (mV) | Behavior on sand |
| --- | --- | --- |
| Example 1 | +28.5 | Film formed on sand |
| 2 | +26.8 | Same as above |
| 3 | +25.7 | Same as above |
| 4 | +23.7 | Same as above |
| 13 | +27.0 | Same as above |
| 14 | +28.7 | Same as above |
| 22 | +25.9 | Same as above |
| 23 | +26.3 | Same as above |
| Control Example 1 | −25.0 | Seeped into sand |
| 2 | +39.0 | Same as above |
| 3 | +25.7 | Same as above |

It is apparent that the film-forming performance on sand of the emulsions according to this invention is remarkably different from the behavior of the control emulsions having like zeta potentials.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A cationic emulsion produced by emulsion polymerization in an aqueous medium of an ethylenically unsaturated monomer in the presence of a cationic group-modified polyvinyl alcohol.

2. A cationic emulsion as set forth in claim 1 wherein said cationic group-modified polyvinyl alcohol is a modified polyvinyl alcohol containing a comonomer unit of the formula (I):

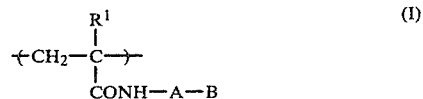

wherein $R^1$ is H or lower alkyl; B is

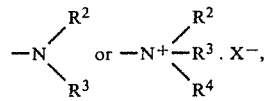

$R^2$, $R^3$ and $R^4$ are each lower alkyl, substituted or unsubstituted; X is an anion capable of forming a salt with an ammonium nitrogen atom; and A is an inert bivalent organic group linking the nitrogen atom of group B to the amide nitrogen atom.

3. A cationic emulsion as set forth in claim 1 wherein said cationic group-modified polyvinyl alcohol is a modified polyvinyl alcohol containing a copolymer unit of the formula (II) or (III):

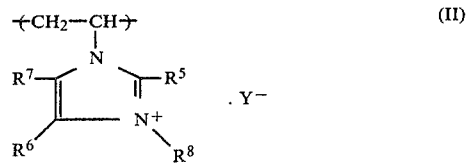

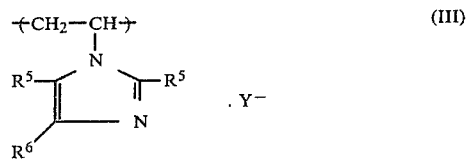

wherein $R^5$, $R^6$ and $R^7$ are each H, lower alkyl or phenyl; $R^8$ is lower alkyl; and Y is an anion forming a salt with the imidazolinium nitrogen atom.

4. A cationic emulsion as set forth in claim 2 wherein, in the copolymer unit of formula (I), A is

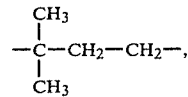

and $R^2$, $R^3$ and $R^4$ are each methyl and X is Cl.

5. A cationic emulsion as set forth in claim 2 wherein, in the copolymer unit of formula (I), $R^1$ is methyl, A is $-CH_2-CH_2-CH_2-$, and $R^2$ and $R^3$ and $R^4$ are each methyl and X is Cl.

6. A cationic emulsion as set forth in claim 3 wherein, in general formula (II) or (III), $R^5$ and $R^8$ are each methyl and $R^6$ and $R^7$ are each H.

7. A cationic emulsion as set forth in claim 1 wherein said ethylenically unsaturated monomer is selected from the group consisting of vinyl acetate, vinyl acetate-ethylene mixtures, vinyl acetate-acrylic acid esters mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

8. A cationic emulsion as set forth in claim 2 wherein said ethylenically unsaturated monomer is selected from the group consisting of vinyl acetate, vinyl acetate-ethylene mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

9. A cationic emulsion as set forth in claim 3 wherein said ethylenically unsaturated monomer is selected from the group consisting of vinyl acetate, vinyl acetate-ethylene mixtures, vinyl acetate-acrylic acid ester mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

10. A cationic emulsion as set forth in claim 4 wherein said ethylenically unsaturated monomer is selected from the group consisting of vinyl acetate, vinyl acetate-ethylene mixtures vinyl acetate-acrylic acid ester mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

11. A cationic emulsion as set forth in claim 5 wherein said ethylenically unsaturated monomer is selected from the group consisting of vinyl acetate, vinyl acetate-ethylene mixtures, vinyl acetate-acrylic acid ester mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

12. A cationic emulsion as set forth in claim 6 wherein said ethylenically unsaturated monomer is selected from the group consisting of vinyl acetate, vinyl acetate-ethylene mixtures, vinyl acetate-acrylic acid ester mixtures, vinyl acetate-higher fatty acid vinyl ester mixtures, vinyl acetate-maleic acid diester mixtures, acrylic acid ester, methacrylic acid ester, acrylic acid ester-methacrylic acid ester mixtures, and vinyl chloride.

* * * * *